United States Patent [19]

Goebel et al.

[11] Patent Number: 4,920,356

[45] Date of Patent: Apr. 24, 1990

[54] ELECTROGRAPHIC RECORDING RECEIVER

[75] Inventors: William K. Goebel; David M. Rakov, both of Rochester, N.Y.

[73] Assignee: Eastman Kodak Company, Rochester, N.Y.

[21] Appl. No.: 286,190

[22] Filed: Dec. 19, 1988

[51] Int. Cl.[5] .......................... G01D 9/00; G01D 15/10; B05D 5/12; B32B 3/00

[52] U.S. Cl. .................................. 346/1.1; 366/76 R; 366/135.1; 428/206; 427/121

[58] Field of Search .................... 346/135.1, 76 R, 1.1; 428/206; 427/121

[56] References Cited

U.S. PATENT DOCUMENTS

| | | | |
|---|---|---|---|
| 3,657,005 | 4/1972 | Brown et al. | 117/201 |
| 3,684,503 | 1/1971 | Humphriss et al. | 96/1.5 |
| 4,241,134 | 12/1980 | Burwasser | 346/135.1 |

FOREIGN PATENT DOCUMENTS

| | | |
|---|---|---|
| 0145463 | 6/1985 | European Pat. Off. . |

*Primary Examiner*—Bruce A. Reynolds
*Assistant Examiner*—Huan H. Tran
*Attorney, Agent, or Firm*—Bernard D. Wiese

[57] ABSTRACT

Disclosed is an electrographic recording receiver for use in a process where styli in a writing head deposit electric charges on an electrographic receiver. The receiver comprises a substrate having a conductive layer on an insulating support, a dielectric layer having an image area on the conductive layer, conductive particles embedded in the image area of the dielectric layer in contact with the conductive layer and extending or protruding through the surface of the dielectric layer to provide an electrical path between a ground and the conductive layer through the conductive particles, and insulating particles embedded in and extending through the surface of the image area of the dielectric layer to a distance greater than the conductive particles to provide a substantially uniform distance between the styli and the dielectric layer. Also disclosed is a method of making such a receiver and a method of forming an electrostatic image on such a receiver.

14 Claims, 1 Drawing Sheet

ELECTROGRAPHIC RECORDING RECEIVER

FIELD OF THE INVENTION

This invention relates to an electrographic recording receiver which comprises a dielectric layer on a substrate which comprises a conductive layer on an insulating support, for use in a process where styli in a writing head deposit electric charges on a receiver; it also relates to a process for making the receiver and a process for using the receiver. In particular, it relates to an electrographic recording receiver where a mixture of insulating and conductive particles are embedded in and extend through the surface of a dielectric layer, where the insulating particles provide a substantially uniform distance between the styli and the dielectric layer, and the conductive particles are in contact with the conductive layer to provide an electrical path between a ground and the conductive layer.

BACKGROUND

An electrographic recording apparatus forms an image by depositing spots of electric charge from styli in a writing head onto an electrographic recording receiver, and developing the latent electrostatic image with a liquid or dry electrostatic toner. A continuous sheet of receiver is drawn over the writing head, which contains closely packed styli that extend across the width of the image area of the receiver. Each stylus can deposit a separate spot of electric charge on the receiver. See, for example, U.S. Pat. No. 3,657,005, issued Apr. 18, 1972.

The receiver comprises a dielectric layer coated on a substrate which has a conductive surface in electrical contact with the dielectric layer. In order for the recording process to operate properly, it is necessary that the air gap between the styli and the exposed surface of the dielectric layer be kept within well-defined limits. This can be accomplished by recessing the styli in the writing head and letting the writing head ride directly on the dielectric layer, but that approach may damage the dielectric layer.

The correct distance between the styli and the dielectric layer can also be maintained by embedding in the dielectric layer insulating particles which extend above the surface of the dielectric layer and function as spacer means. The writing head is kept in contact with these particles as the receiver is drawn across it, thereby maintaining a uniform and correct distance between the styli and the dielectric layer. Charges are deposited on the dielectric layer when a sufficient voltage is applied between a stylus and the conductive surface of the substrate to break down the air between the stylus and the dielectric layer.

The substrate is either entirely conductive or it comprises a conductive layer on an insulating support. IN order for a charge to be deposited on the dielectric layer, the conductive surface of the substrate must be grounded. Substrates that are entirely conductive can be easily grounded through the exposed (opposite) surface of the substrate. However, this invention is concerned with receivers that have a substrate which comprises a conductive layer on an insulating support and, therefore cannot be grounded through the exposed (insulating) surface of the substrate. These receivers are normally grounded by means of conductive stripes along the edges of the receiver which are in electrical contact with the conductive layer. While this method of grounding is satisfactory for a receiver that is not very wide, if the receiver is wide the resistance between these stripes and a stylus at the center of the receiver is greater than the resistance between a stylus near the edge of the receiver and the closest stripe. This variation in resistance may result in corresponding non-uniform image quality. If the resistance is too high, the charge builds up on the conductive layer because it cannot be drained away fast enough, which results in toner being deposited on the receiver during development where it is not intended. Also, a loss in image density can occur because the air breakdown between the stylus and the dielectric layer is inhibited. On the other hand, if the resistance is too low, charge is not easily placed on the receiver and there is a loss in image density.

In addition, grounding the receiver by means of edge stripes complicates the manufacturing process because a procedure must be provided for applying these stripes to the receiver. It also complicates inventory management because, in order to minimize the cost of making the receiver, the stripes are applied to the receiver at the same time the receiver is made. Since the receiver is sold in many different widths and the receiver cannot be longitudinally cut once the edges stripes are in place, it is necessary to keep an inventory of each width, which significantly adds to inventory cost.

SUMMARY OF THE INVENTION

The present invention provides an electrographic recording receiver for use in a process where styli in a writing head deposit electric charges on the receiver. The unique feature of the receiver of this invention is the presence of both insulating and conductive particles which are embedded in the image area of the dielectric layer of the receiver and which extend or protrude through the surface of the dielectric layer. The insulating particles act as spacer means and maintain a predetermined distance between the writing head and the dielectric layer while the conductive beads provide an electrical path between a ground and the conductive layer. The insulating particles extend through the surface of the dielectric layer to a distance greater than the conducting particles to avoid electrical contact between the write head and the conducting layer in the receiver. The invention also provides a method of making the receiver in which the conductive particles are applied to the support as part of the composition used for the conductive layer so that good electrical contact is made between the conductive particles and the conducting layer. The invention further provides a method of using the receiver to form an electrostatic image by moving the receiver relative to a writing head while grounding the conductive layer through the conductive particles.

Because the conductive layer is grounded through the conductive particles, the conductive layer can be grounded across the entire width of the image area of the receiver, so that the distance between the ground and any given stylus in the writing head is nearly identical and, therefore, the resistance between the ground and any given stylus is also nearly identical. As a result, variations in resistance between each stylus and the ground at different positions across the width of the receiver are avoided. Since the resistance between the ground and each stylus is very uniform, it can be optimized for maximum quality in the copies, and variations in copy quality due to variations in resistance are avoided. In addition, because electrical contact to the conductive layer is made through the conductive particles, no edge stripes are required in the receiver of this invention. This eliminates the additional manufacturing step of applying such stripes to the receiver. The necessity for maintaining inventories of many different widths of receiver is also avoided because the receiver can now be slit longitudinally to any desired width.

BRIEF DESCRIPTION OF THE DRAWINGS

In FIG. 1, an electrographic recording receiver 1 has a substrate which comprises an insulating support 2 and a conductive layer 3. On conductive layer 3 is a contiguous or immediately adjacent dielectric layer 4. Embedded in dielectric layer 4 and protruding through the surface thereof are insulating particles 5 and conductive particles 6. Conductive particles 6 are in electrical contact with conductive layer 3 and protrude through the surface of the dielectric layer to a lesser extend or distance than the insulating beads.

In FIG. 2, an electrographic recording apparatus 7 comprises a writing head 8 which contains a row of styli 9, which extend across the image area 10 of receiver 1. (The receiver shown in FIG. 1 is inverted in FIG. 2.) The apparatus also includes a roller 11 which grounds the conductive layer in the receiver through the conductive particles, and a toning station 12 which applies charged toner to the latent electrostatic image formed on the receiver by writing head 8. The apparatus of FIG. 2 may include a fixing station (not shown) to fix the toner to the receiver if the toner is not self-fixing.

DESCRIPTION OF THE PREFERRED EMBODIMENTS

Figure 1:
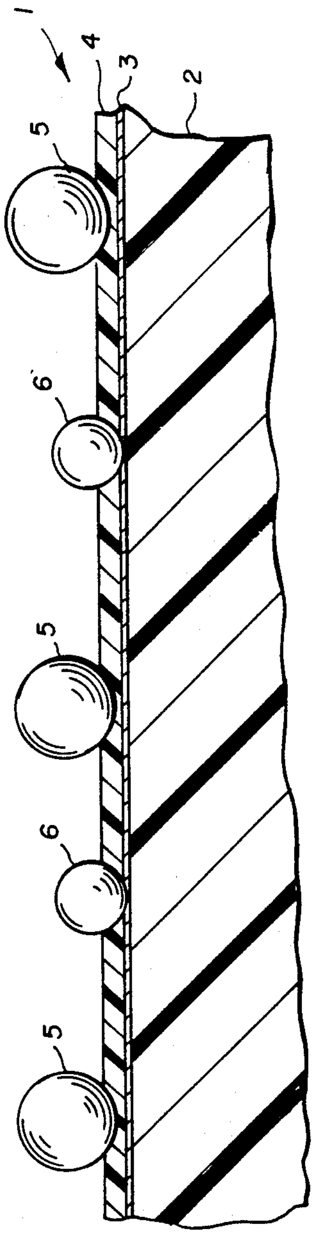
FIG. 1 is a side view in section through the image area of one embodiment of an electrographic recording receiver according to this invention wherein the insulating and conducting particles are spherical.
Figure 2:
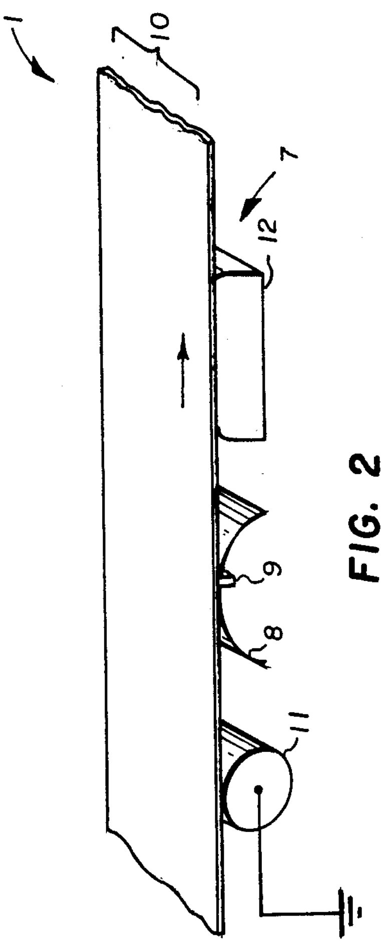
FIG. 2 is a diagrammatic isometric view of an electrographic recording apparatus for recording images on a receiver according to this invention.

The substrate used in forming the electrographic recording receiver of this invention can be any of the conventional substrates used in making electrographic recording receivers, which comprise a conductive layer on an insulating support. Insulating supports, which provide mechanical strength to the substrate, are typically about 25 to about 250 μm thick, and often about 100 to 180 μm thick, and can be made from a variety of film-forming polymers such as polyesters, polycarbonates and polyolefins such as polyethylene, and polypropylene. A polyester, polyethylene terephthalate, is conveniently used as it is a readily commercially available support. Transparent film is the preferred material for the support as transparent receivers are useful in making transparencies such as overlays and duplicates but, paper or other opaque materials can also be used. The resistivity of the support material should be greater than the resistivity of the material that forms the conductive layer so that the conductivity of the support does not supplement the conductivity of the conductive layer beyond acceptable limits.

Electrographic receivers of the invention are often used in conventional electrographic recording systems of the so-called "multiplex" type. Such a system generally requires that the resistivity of the conductive layer falls within a narrow range. The conductive layer must be conductive enough to carry a charge at a sufficient rate to prevent the conducting layer as a whole from acquiring a voltage significantly different from ground. However, the conducting layer must not be too conductive because that would prevent the brief localized deviation from ground voltage in the conducting layer that must be provided by shoe electrodes to achieve image formation. In general, the aforementioned narrow range of resistivity of the conductive layer is about $1\times10^6$ to $3\times10^6$ ohms/square. (A "square" means that the resistance is measured between opposite edges of any size square in the conductive layer.)

Conductive layers used in the electrographic recording receivers of this invention comprise a variety of materials that have the appropriate conductivity, including a large number of materials known in the prior art. Such materials are often transparent which permits the receivers to be used as transparencies. A typical conducting layer can comprise a film of electrical insulating binder having dispersed therein a metal-containing semiconductor compound, as described, for example, in U.S. Pat. No. 3,245,833, issued Apr. 12, 1966. Such semiconductor compounds are described in that patent as having an electrical resistivity (specific resistance) in the range from $1\times10^{-3}$ to $1\times10^9$ ohm-cm, as measured by standard procedures, and include, for example, such materials as cuprous and silver halides, halides of bismuth, gold, indium, iridium, lead, nickel, platinum, rhenium, tin, tellurium, and tungsten; cuprous, cupric and silver thiocyanates, and iodomercurates and other metal-containing semiconductor compounds. U.S. Pat. No. 4,237,194, issued Dec. 2, 1980, describes suitable conductive layers comprising coalesced cationically stabilized latex binder and a polyaniline salt semiconductor formed by the reaction of a polyaniline and an acid. Particularly suitable polyanilines described in U.S. Pat. No. 4,237,194 for forming the conductive coatings are imines such as N-{p-[4-(pmethoxyanilino)anilino]phenyl}-1,4-benzoquinone imine, N-{p-[p-(anilino)anilino]phenyl}-1,4-benzoquinone diimine and No{p-[4-(p-methylanilino)anilino]}phenyl-1,4-benzoquinone imine. U.S. Pat. No. 4,070,189, issued Jan. 24, 1978, also describes suitable conducting layers that can be used in the electrographic recording receivers of this invention. Such layers comprise highly crosslinked vinylbenzyl quaternary ammonium polymers dispersed in a hydrophobic binder. A typical thickness for the conductive layer used in the practice of this invention is about 0.1 to 1 μm, although thin metal coatings such as indium tin oxide can be used at a thickness of only about 0.01 μm where they are almost transparent.

The dielectric layer must be a good insulator so that charges placed on it by the writing head do not drain away prior to development. A desirable resistivity for the dielectric layer is at least $10^{13}$ ohm-cm, and preferably at least $10^{15}$ ohm-cm. Higher resistivities are normally used if there is a long period of time between charging and development. The thickness of the dielectric layer is important for proper imaging. If the dielectric layer is too thin, the charge may leak off the dielectric layer more readily or the voltage may be too low for effective development, and if it is too thick, a higher voltage is required to place a charge on it. The optimal thickness of the dielectric layer also depends on the dielectric constant of the material from which it is formed. Most polymers that are useful in forming the dielectric layer have a dielectric constant of about 2.5 to 3.5, which usually corresponds to an optimal thickness of about 3 to 4 μm. Transparent materials are preferred for the dielectric layer for the same reason given hereinbefore, and it is also desirable that the dielectric layer be made of a material to which the toner will adhere. If a liquid developer comprising toner particles suspended in a liquid is to be used, the dielectric layer must, of course, be insoluble in the liquid. Suitable dielectric layers are well known in the art and can be formed from a large number of film-forming polymeric materials. Typical dielectric layers comprise film-forming polymeric binders having high dielectric strength which are good electrically insulating materials including, for example, polyesters, polysulfones, polycarbonates and polyolefins as exemplified by styrene-butadiene copolymers, poly(vinyl chloride), vinylidene chloride acrylonitrile copolymers, poly(vinyl acetals), such as poly(-vinylbutral), polyacrylic and methacrylic esters such as poly(methyl methacrylate), and poly(N-butyl methacrylate), polystyrene, polymethylstyrene, polyesters such as copoly[ethylene-coalkylene bis(alkyleneoxyarylene) phenylenedicarboxylate] for example, poly[ethyleneoxyphenylene) terephthalate, phenolformaldehyde resins, polyethylene and polypropylene.

There is an optimum distance for the space between the styli in the recording head and the surface of the dielectric layer that minimizes the voltage needed to deposit a sufficient imaging charge. The insulating particles perform the function of keeping the styli at the proper distance from the receiver necessary efficiently to place a charge on the receiver. (See, for example, U.S. Pat. No. 3,657,005, issued Apr. 18, 1972). This is accomplished by maintaining contact between the writing head and the insulating particles during writing. (The styli may or may not be recessed in the writing head, but the writing head does not contact the dielectric layer.) To perform their spacing function, the insulating particles must be hard enough to support the writing head and not flake off or break as the writing head rubs against them. The insulating particles are substantially inert chemically, physically and electrically. Suitable discrete particulate materials are well known in the prior art and include, for example, polymeric beads such as polyethylene beads, or poly(methyl methacrylate) beads of the type described in U.S. Pat. No. 3,810,759, issued May 14, 1974, glass beads, polystyrene beads and other particles such as titanium dioxide, silicon dioxide, aluminum oxide, clay and talc. The particles can have a variety of regular or irregular shapes, including, for example, elongated, spherical, cylindrical or conical. However, it is important that a uniform distance be maintained between the styli and the receiver, and therefore the particles are preferably spherical and of uniform diameter. In performing their spacing function the insulating particles protrude above the surface of the dielectric layer in which they are embedded to the extend necessary to maintain the desired distance between the styli and the receiver. The insulating particles preferably extend beyond the surface of the dielectric layer by about 7 to 12 μm when the styli are flush with the writing head. Depending upon the thickness of the dielectric layer and how far into the dielectric layer the insulating particles rest, particles having an average diameter of about 10 to 20 μm (measured perpendicular to the receiver surface) are usually adequate to maintain an appropriate distance between the styli and the receiver. The diameter of a particle is its greatest linear dimension. The particles should also be insulating at least to the same extend as the dielectric layer, so that they do not provide an electrical path between the styli and the conductive layer. The concentration of insulating particles should be adequate to maintain the correct distance between the styli and the dielectric layer, but the use of insulating particles in excess of that concentration should generally be avoided as this causes a transparent receiver to appear cloudy.

The conductive particles perform the function of providing an electrical path between the conductive layer and a ground. To perform this function, the particles are made of a material which is sufficiently conductive to drain the charges from the conductive layer during writing and development. Particles having a resistivity less than about $1\times10^5$ ohm-cm are generally suitable, although less conductive particles can be used if they are present in a greater quantity. Like the insulating particles, the conducting particles can have a variety of shapes. Suitable discrete particulate materials include, for example, graphite, carbon black, nickel, silver, aluminum, copper, and tin. The conductive particles are preferably polymeric conductive beads because such particles are quite transparent and scatter light less than many other conductive materials.

Suitable conductive particles are conveniently prepared by conventional techniques including grinding or polymerization techniques such as suspension polymerization or emulsion polymerization as described, for example, in U.S. Pat. No. 2,701,245 issued Feb. 1, 1955; Pat. No. 2,932,629, issued Apr. 12, 1960, Pat. No. 3,586,654, issued June 22, 1971, and Pat. No. 3,847,886, issued Nov. 12, 1974. The polymeric conducting particles generally comprise anionic or cationic conductive groups such as ammonium, phosphonium, carboxylate and sulphonate groups. Useful monomers that provide such conductive groups are well known and include, for example, N-vinyl-4-methyl-2-oxazolidinone, N-vinyltrimethylammonium chloride, N-(3-acrylamidopropyl)trimethylammonium chloride, acryloyloxyethyldimethylsulphonium chloride, N-(methacryloyloxyethyl)trimethylammonium chloride, N-(methacryloyloxyethyl)trimethylammonium methyl sulphate, N-(2-hydroxy-3-methacryloyloxypropyl)trimethylammonium chloride, N-acryloyloxyethyl)pyridinium chloride, N-methyl-4-vinylpyridinium chloride, vinylbenzyltrimethylammonium chloride, and glycidyltributylphosphonium chloride. The conductive polymers are frequently crosslinked and typical crosslinking monomers used for this purpose are addition polymerizable monomers containing at least two ethylenically unsaturated groups and include, for example, divinylbenzene, allyl acrylate, allyl methacrylate, 1,3-butylene diacrylate, 1,3-butylene dimethacrylate, 1,4-cyclohexylenedimethyl dimethacrylate, diethylene glycol dimethacrylate, diisopropylidene glycol dimethacrylate, ethylene diacrylate ethylene dimethacrylate, 1,6-hexamethylene diacrylate, 1,6-hexamethylene dimethacrylate, tetraethylene glycol dimethacrylate, tetramethylene diacrylate, tetramethylene dimethacrylate and vinyl methacrylate. Typical polymeric particles comprise conductive homo- or copolymers such as alkali metal salts of partially or completely sulphonated polystyrene (also in free acid form), copolymers of acrylic, methacrylic or maleic acid, polyvinylsulphonic acid (also in free acid form), polyvinylphosphonic acid, polyethyleneimine hydrochloride, quaternized polyethyleneimine. Particularly useful conducting particles are those that comprise poly(styrene-co-N-vinylbenzyl-N,N,N-trimethylammonium chloride-co-divinylbenzene) illustrated in the following Examples, poly(N-vinylbenzyl-N,N,N-trimethylammonium chloride-co-ethylene dimethacrylate) and poly(N-vinylbenzyl-N,N,N-trimethylammonium chloride-co-ethylene diacrylate).

The concentration of conductive particles is adequate to ground the conductive layer. The specific concentration used in a given situation depends upon such things as the conductivity of the particles, the writing speed, and the thickness and dielectric constant of the dielectric layer. For example, if the writing speed is 2.54 cm/sec and the dielectric layer is 3.5 μm thick and has a dielectric constant of 3, the minimum number of conductive particles (per $cm^2$) should be about $6\times10^{-3}$ times their resistivity (in ohm-cm). The use of excess conductive particles is generally avoided as they may make a transparent receiver appear cloudy. A suitable average diameter (measured perpendicular to the receiver surface) for the conductive particles is usually about 5 to 15 μm and the diameter of a particle is its greatest linear dimension. The conductive particles are preferably spherical and of uniform diameter so that each bead extends about the same distance beyond the surface of the dielectric layer. Both the insulating and the conductive particles are preferably uniformly dispersed across the image area of the receiver.

To minimize shorting of the styli through the conductive particles to the conductive layer, such particles are selected so that the conductive particles do not extend as far beyond the dielectric layer as do the insulating beads. A desirable distance between the tops of the insulating particles and the tops of the conductive particles is about 1 to 10 μm. If the distance between the tops of the insulating particles and the tops of the conductive particles exceeds about 10 μm, it is difficult to make electrical contact between the ground and the conductive particles. If the conductive particles extend as far through the dielectric layer as the insulating particles, the writing head rides on the conductive particles and the insulating particles become superfluous. The conductive particles can be the same size as the insulating particles and yet not extend through the dielectric layer as much as the insulating particles. This is because the conductive particles are in contact with the conductive layer, or are embedded in the conductive layer, while the insulating particles are not necessarily in contact with the conductive layer. Nevertheless, to make certain that the insulating particles extend beyond the conductive particles it is preferably that the conductive particles have a smaller average diameter than the insulating particles.

Electrical contact between a ground and the conductive particles can be made using a variety of grounding devices, such as, for example, a conductive roller, a conductive shoe or a conductive brush. A conductive roller is preferably made of a compliant material so that portions of the roller can be pressed past the insulating particles to make contact with the conductive particles. However, it may also be possible to use a non-compliant roller and compress or depress the insulating particles sufficiently for the roller to make electrical contact with the conductive particles. The ground can be placed before or after the writing head, as desired, but is is preferably placed close to the writing head to provide a short electrical path. The ground need only cover the image area of the receiver, and need not make contact with the edge of the receiver if that portion of the receiver is not used to form images. The toning station is desirably placed close to the writing head for compactness, and also so that development occurs before very much charge has drained off the dielectric layer. Toning may be accomplished with any of a wide variety of developers used for this purpose, including both dry and liquid electrostatic developers. The toner may be self-fusing as described, for example, in U.S. Pat. No. 4,659,640, issued Apr. 21, 1987 and Pat. No. 4,507,377, issued Mar. 26, 1985. It is usually desirable to bias the development electrode during development.

In making the receiver it is important to insure good electrical contact between the conductive particles and the conductive layer. This can be accomplished by incorporating the conductive particles into the composition used to form the conductive layer. It has been found that if the conductive particles are mixed with the material from which the dielectric layer is formed, the conductive particles may not provide good electrical contact with the conductive layer and the receiver may not be adequately grounded through the conductive particles. Once the conductive layer has been formed, the dielectric layer containing the insulating particles can be applied over the conductive layer.

Of course, electrographic recording receivers of the invention can contain any of the optional additional layers and components known to be useful in such receivers in general, such as for example, subbing layers, overcoat layers, surfactants, plasticizers, and release agents.

The following examples further illustrate this invention.

EXAMPLE 1

An electrographic receiver of the invention was prepared as follows: The support utilized comprised 102 μm thick poly(ethylene terephthalate). A conducting layer was coated over the support. The conducting layer was prepared according to the procedure of Example 1 of U.S. Pat. No. 4,237,194, issued Dec. 2, 1980, and comprised N-{p-[4-(p-methoxyanalino)anilino]-phenyl}-1,4-benzoquinone imine phosphate salt, the polyanaline salt semiconductor, and 4 percent by weight, of poly(styrene-co-N-vinylbenzyl-N,N,N-trimethylammonium chloride-co-divinylbenzene (30:30:20 weight ratio) conductive beads having an average diameter of about 10 μm. The bead coverage was 1400 beads/$cm^2$ and the layer coverage was 0.0183 mg/$cm^2$.

A dielectric layer was coated over the conductive layer. The dielectric layer comprises 98 weight percent poly[ethylene-co-4,4'-isopropylidene-bis(phenyleneoxyethylene) terephthalate (50:50 weight ratio) as binder, and 2 weight percent, polyethylene insulating beads having an average diameter of about 16 μm. The bead coverage was 3500 beads/$cm^2$. The dielectric layer was about 3.5 μm thick and the layer coverage was 0.377 mg/$cm^2$. The conductive beads projected about 6 μm above the surface of the dielectric layer and the insulating beads projected about 12 μm above such surface.

The receiver was imaged with an electrographic recording apparatus, a Gould 5200 plotter, which had a capacitively coupled writing head. Contact with the conductive beads was made by means of a compliant conductive grounded roller. The roller was made using a mixture of glue and glycerine and was placed close to the writing head on the input side. Imaging was conducted at a relative humidity of 50 percent and the image was toned with a conventional liquid electrostatic developer. Image density and sharpness were excellent and there was no background toning, which would have occurred if there had been a poor ground to the conductive layer.

EXAMPLE 2

Example 1 was repeated with three receivers except that the coverages of the conductive beads was 1050 beads/cm$^2$, 700 beads/cm$^2$, and 350 beads/cm$^2$. The three receivers imaged and toned as in Example 1 and provided substantially the same results.

The invention has been described in detail with particular reference to preferred embodiments thereof, but it will be understood that variations and modifications can be effected within the spirit and scope of the invention.

What is claimed is:

1. An electrographic recording receiver for use in a process where styli in a writing head deposit electric charges on an electrographic receiver comprising (A) a substrate that comprises a conductive layer on an insulating support;

(B) a dielectric layer having an image area on said conductive layer;

(C) conductive particles that are embedded in said image area of said dielectric layer, are in contact with said conductive layer and extend through the surface of said dielectric layer to provide an electrical path between a ground and said conductive layer through said conductive particles; and (D) insulating particles that are embedded in said image area of said dielectric layer and extend through the surface of said dielectric layer beyond said conductive particles to provide a substantially uniform distance between said styli and said dielectric layer.

2. A receiver according to claim 1 wherein said insulating support is a film.

3. A receiver according to claim 1 wherein said dielectric layer is about 3 to 4 $\mu$m thick and comprises a polymeric material having a dielectric constant of about 2.5 to 3.5.

4. A receiver according to claim 1 wherein said dielectric layer has a resistivity greater than about $1^{15}$ ohm-cm and said insulating particles have a resistivity greater than about $10^{15}$ ohm-cm.

5. A receiver according to claim 1 wherein said insulating particles have an average diameter of about 10 to 20 $\mu$m and said conductive particles have an average diameter of about 5 to 15 $\mu$m.

6. A receiver according to claim 1 wherein said conductive and insulating particles are uniformly dispersed across the surface of said dielectric layer.

7. A receiver according to claim 1 wherein said dielectric layer comprises a polyester.

8. A receiver according to claim 1 wherein said insulating particles comprise polyethylene.

9. A receiver according to claim 1 wherein said conductive particles comprise a conductive polymer.

10. A receiver according to claim 6 wherein said conductive and insulating particles are substantially spherical polymeric beads of substantially uniform diameter.

11. A receiver according to claim 1 wherein said conductive particles are smaller than said insulating particles.

12. A receiver according to claim 1 wherein said insulating particles extend about 1 to 10 $\mu$m beyond said conductive particles.

13. A method of forming an electrostatic image on a receiver of claim 1 comprising moving said receiver relative to a writing head comprising styli, maintaining said writing head in contact with said insulating particles and depositing electric charges on said dielectric layer from said styli while grounding said conductive layer through said conductive particles.

14. A method of making an electrographic recording receiver comprising (A) depositing on an insulating support a conductive layer containing conductive particles that extend through the surface of said conductive layer, and (B) depositing a dielectric layer on said conductive layer at a thickness such that said conductive particles protrude through the surface of the dielectric layer, said dielectric layer containing insulating particles that also protrude through its surface.

* * * * *